Jan. 30, 1940.    D. W. SMITH    2,188,558
MULTIPLE PIE PLATE HOLDER
Filed May 5, 1939
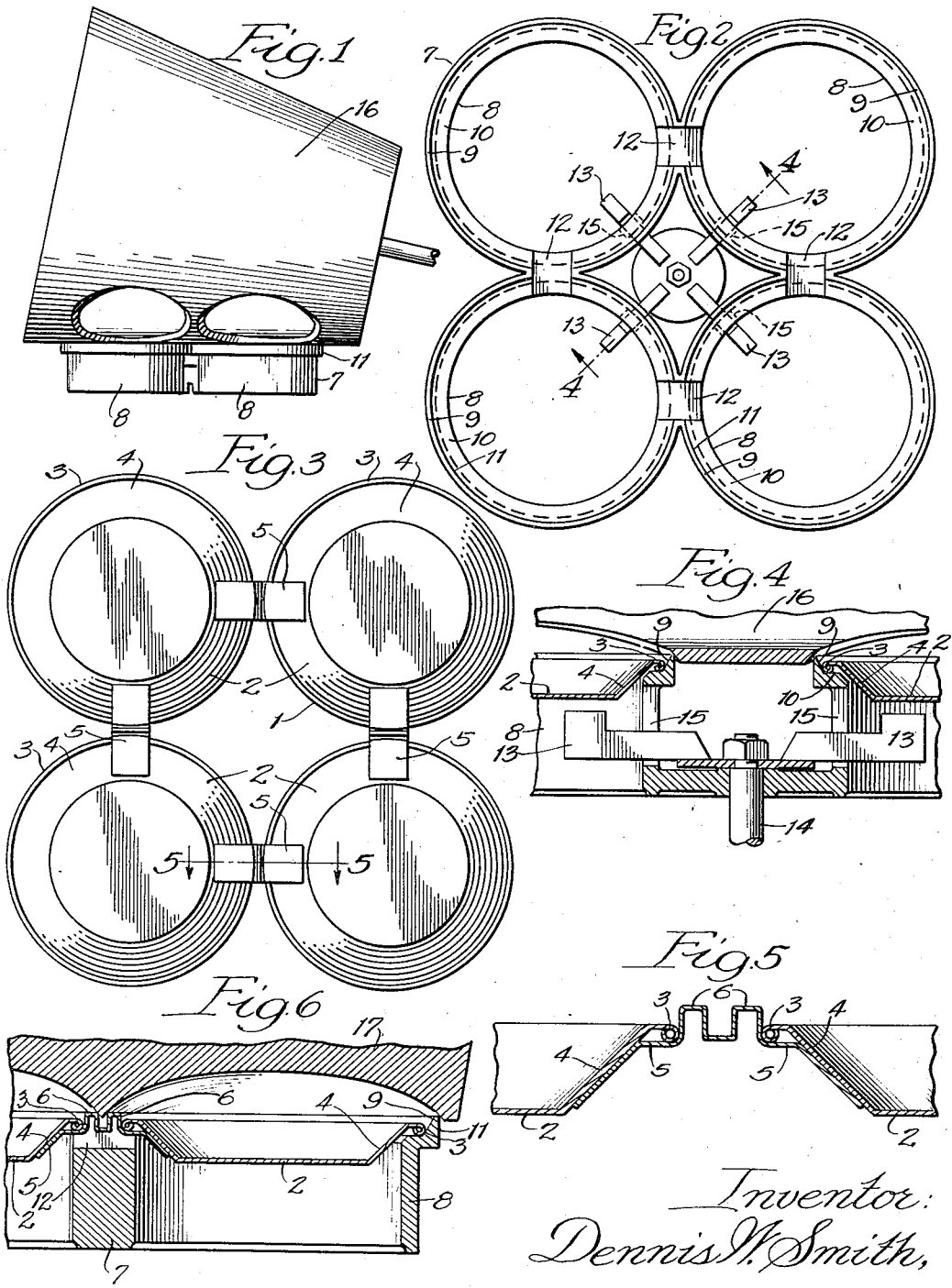
Inventor:
Dennis W. Smith, Patented Jan. 30, 1940

2,188,558

UNITED STATES PATENT OFFICE 2,188,558

MULTIPLE PIE PLATE HOLDER

Dennis W. Smith, Chicago, Ill., assignor to Colborne Manufacturing Company, Chicago, Ill., a corporation of Illinois Application May 5, 1939, Serial No. 271,928

5 Claims. (Cl. 107—1)

This invention relates to improvements in pie making machines of the type employing a procession of multiple plate units traveling on a conveyor, and is related particularly to means carried by the conveyor for removably holding plate units each comprising a cluster of connected plates, the holding means also being formed for cooperation with a crust trimmer.

A pie making machine of the class for which the improvement is designed comprises a circular or elliptical conveying means moving around a table supporting processing machinery. The conveyor is equipped with a series of spaced holders within which pie plates are placed. Means for performing the operations involved in the manufacture of pies are carried by the table and extend into the path of the plates, which travel one by one through the several operations necessary in producing a pie. Usually the final step, before the plates carrying completed pies are removed from the conveyor, is in trimming excess dough extending from the pies over the edges of the plate holders. The plate holder rims extend above the plates and contact with a correspondingly shaped crust shearing means. As a plate is removed from the conveyor it is replaced by an empty one and since the conveyor is meanwhile continuously rotating it is necessary that the plate changing be effected quickly.

In the production of small pies, for time saving it is desirable that the plates travel in a series of groups so that one operation may be performed on several pies simultaneously, and for convenience in handling it is necessary that the plates in each group be connected together.

Plate holders designed for use in such a machine are mentioned in patents to Dennis W. Smith Nos. 1,725,835, August 27, 1929; 1,728,702, September 17, 1929; and 1,671,321, May 29, 1928, which describe respectively, holding means for a set of connected square plates; a holder capable of receiving grouped separate plates and having an upper edge for coacting with a dough trimmer; and equipment for effecting automatic ejection of plates from the holders.

In the present case it is desired to provide ejection means in combination with a holder, having shearing edges and arranged to carry a cluster of connected circular plates without interfering with the trimming operation.

Accordingly, it is the object of the invention to provide a holder for a plurality of connected circular plates, allowing easy, rapid, automatic removal and replacement thereof, and adapted for cooperation with a crust trimmer.

The improvement is illustrated by the accompanying drawing, wherein:

Figure 1 is a side elevation of a plate holding unit, together with a crust trimmer.

Fig. 2 is a plan view of the plate holding unit.

Fig. 3 is a bottom view of the connected plates.

Fig. 4 is a sectional detail taken on the line 4—4 of Fig. 2.

Fig. 5 is a sectional detail taken on the line 5—5 of Fig. 3.

Fig. 6 is a fragmentary sectional view showing the plates resting in the holding unit and showing a trimmer above.

The improved plate holder comprises a plurality of joined cylinders or rings centered around the end of a reciprocal shaft which carries radial ejecting arms extending into the lower part of the holder through slots in the walls thereof. The shaft is vertically ocscillated by means similar to that described in patent to Dennis Smith No. 1,671,321.

A corresponding number of plates connected together in spaced apart relation is rested within the rings above the ejecting arms. The connecting means for the plates extends from one plate to another through recesses in shearing edges at the top of the rings. The plate connecting means form continuations of the annular shearing edges of the holders at the recesses therein. The crust trimmer has a similar number of circuitous shearing edges. The plate units are removed from the holder by an upward movement of the ejecting arms.

Fig. 3 shows a bottom plan of a multiple pie plate unit 1, wherein plates 2 having annular outer beading 3 at the top of the flanges 4 are held together in spaced relation by metal straps 5 fast at each end to the flanges 4 of the plates 2. The straps 5 are bent to extend above the plates 2 and are formed in the middle as shown in Fig. 5 to provide shoulders 6 running lengthwise with the edges of the plates 2.

As shown in Fig. 2, the holder 7 for the plate unit 1 is a series of connected rings 8, each having a shearing edge 9 at the top and each being formed to provide an inner annular shoulder 10 upon which to rest the beading 3 of the plate flanges 4. The shoulders 10 are located at a sufficient distance from the top of the rings to permit the shearing edges 9 to project above the plates 2. The flanges 11 formed between the shearing edges 9 and the shoulders 10 have slots 12 for receiving the connecting straps 5 of the pie plates 2. When the plates 2 are at rest in the holders the top surfaces of the shoulders 6 of the straps 5 are flush with the shearing edges 9, the shoulders 6 forming continuations of the shearing edges 9.

The enclosure formed by the grouped rings 8 serves as a guide for plate ejecting fingers 13 carried by a vertically reciprocal shaft 14. The radial ejecting arms 13 extend through slots 15 in the rings to positions underneath the plates 2.

In the operation of a machine employing the improvement the shearing edges 9 cooperate with types of crust trimmers such as the trimmer 16 shown in Fig. 1 as a hollow cone or the trimmer 17 shown in Fig. 6, which is a solid recessed cylinder. The operation of such trimmers is described in patent to Smith, No. 1,728,702, but in either case the cutting edges 21 of the trimmers fit around the shearing edges 9 of the rings 8 and the continuation surfaces 6 of the connecting straps 5 for the pie plates.

At a point in the route of the plates 2 where it is desired to remove them from the holder 7 the shaft 14 is moved upwardly by actuating means located below the conveyor, thus causing ejector arms 13 to contact the plates 2 and move them to a position at the top of the holder 7 from where they are removed. The ejector arms 13, of course, move downwardly after this operation, allowing new plates to be inserted.

I claim:

1. A pie plate unit comprising a plurality of circularly arranged and laterally spaced plates, connecting straps between the adjacent sides of the plates, extending above the plates and formed with central shoulders between the plates; and a holder for the plate unit comprising a corresponding plurality of rings formed with crust shearing edges at the top of the rings, the crust shearing edges each being cut away to receive said connecting straps so that said central shoulders provide for continuations of the crust shearing edges, inner annular plate rests on the holders below the crust shearing edge, and vertical slots in the sides of the holders below the plate rests, in combination with an ejector having radiating arms extending through the slots into the rings, and means for vertically reciprocating said ejector.

2. A pie plate unit comprising a plurality of laterally spaced plates, connecting straps between the adjacent sides of the plates, extending above the plates and formed with central shoulders, a holder for the plate unit comprising a corresponding plurality of rings formed with crust shearing edges at the top of the rings, the crust shearing edges each being cut away to receive the connecting straps so that said central shoulders provide continuations of the crust shearing edges, inner annular plate rests below the crust shearing edges, and an ejecting means for the pie plate unit.

3. A pie plate unit comprising a plurality of laterally spaced plates, connecting straps between the adjacent sides of the plates, extending above the plates and formed with central shoulders, a holder for the plate unit comprising a corresponding plurality of rings formed with crust shearing edges at the top of the rings, the crust shearing edges each being cut away to receive the connecting straps so that said central shoulders provide continuations of the crust shearing edges, and inner annular plate rests below the crust shearing edges.

4. A pie plate holder comprising a plurality of circularly arranged and laterally spaced connected rings formed with crust shearing edges at the top of the rings and an inner annular plate rest below each shearing edge, vertical slots in the sides of the holders below the plate rests, in combination with an ejector having radiating arms extending through the slots into the rings.

5. A pie plate holder comprising a plurality of circularly arranged and laterally connected ring-shaped plate rests having sides provided with vertical slots, in combination with an ejector having radiating arms extending through said slots into the plate rests.

DENNIS W. SMITH.